United States Patent
Kuehnle et al.

(10) Patent No.: US 8,379,088 B2
(45) Date of Patent: Feb. 19, 2013

(54) METHOD AND SYSTEM FOR EVALUATING BRIGHTNESS VALUES IN SENSOR IMAGES OF IMAGE-EVALUATING ADAPTIVE CRUISE CONTROL SYSTEMS

(75) Inventors: Andreas Kuehnle, Villa Park, CA (US); Cathy Boon, Orange, CA (US)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 381 days.

(21) Appl. No.: 12/674,920

(22) PCT Filed: Aug. 28, 2008

(86) PCT No.: PCT/EP2008/007045
§ 371 (c)(1),
(2), (4) Date: Feb. 24, 2010

(87) PCT Pub. No.: WO2009/030423
PCT Pub. Date: Mar. 12, 2009

(65) Prior Publication Data
US 2011/0109744 A1    May 12, 2011

Related U.S. Application Data

(60) Provisional application No. 60/966,757, filed on Aug. 29, 2007.

(51) Int. Cl.
*H04N 9/47* (2006.01)

(52) U.S. Cl. .... 348/148; 340/151; 340/159; 340/E3.018

(58) Field of Classification Search .................. 348/148, 348/151, 159, E3.018
See application file for complete search history.

(56) References Cited

U.S. PATENT DOCUMENTS

| | | | |
|---|---|---|---|
| 2006/0077070 A1 | 4/2006 | Huang | |
| 2006/0106518 A1* | 5/2006 | Stam et al. | 701/49 |
| 2007/0221822 A1* | 9/2007 | Stein et al. | 250/205 |

FOREIGN PATENT DOCUMENTS

| | | |
|---|---|---|
| DE | 10243620 A1 | 4/2004 |
| DE | 10 2004 017 890 A1 | 7/2005 |

OTHER PUBLICATIONS

Dickmanns, Ernst D., Dynamic Vision for Perception and Control of Motion, Chapter 7: Beginnings of Spatiotempral Road and Ego-State Regognition, 22 pages.
International Search Report for PCT/EP2008/007045 mailed Mar. 3, 2009, 6 pages.

* cited by examiner

*Primary Examiner* — Yves Dalencourt
(74) *Attorney, Agent, or Firm* — Osha Liang LLP

(57) ABSTRACT

A method and a system for evaluating sensor images of an image-evaluating adaptive cruise control system on a moving support, especially a vehicle which moves on a roadway, are disclosed. Irregularities, especially tar strips or tar joints on the roadway are evaluated due to their geometric shapes, their brightness, their contrast and/or their reflectivity to distinguish them from markings relating to the predetermined trajectory.

11 Claims, 1 Drawing Sheet

METHOD AND SYSTEM FOR EVALUATING BRIGHTNESS VALUES IN SENSOR IMAGES OF IMAGE-EVALUATING ADAPTIVE CRUISE CONTROL SYSTEMS

PRIOR ART

The invention relates to a method and to an arrangement for evaluating brightness values in sensor images of an image-evaluating surroundings-detection system, in particular, for example, for detecting tar joints or tar strips in or on the carriageway in driver assistance systems in motor vehicles, according to the preamble of method claim 1 et seq., and to the arrangement according to claim 10 et seq. and to a computer program product according to claim 13.

Such driver assistance systems are used to assist a driver of a motor vehicle in carrying out specific operations in road traffic and are already used for a wide variety of tasks. For example, DE 10 2004 017 890 A1 discloses that with what is referred to as a LIDAR radar sensor a predefined area ahead of the vehicle in the direction of travel is detected with respect to specific objects, and specific safety functions can be triggered in good time by corresponding evaluation of the sensor signals.

These systems which are known per se can be used, for example, within the scope of an adaptive cruise controller and/or inter-vehicle distance control system of a vehicle, wherein such a control process can then be carried out without intervention by the driver a previously set velocity and/or a previously set distance from a vehicle travelling ahead or from objects located in the direction of travel. This is usually done by correspondingly taking into account the surroundings of the vehicle and, if appropriate, further parameters such as, for example, the weather conditions and visibility conditions. Such a control system is also often referred to as an adaptive cruise control system (ACC system). The ACC system must, in particular, be flexible enough in respect of the increasing traffic density of the present time, in order to react suitably to all driving situations. This requires in turn a corresponding object-detection sensor system in order to supply the measurement data which are necessary for the control process in each driving situation.

For this purpose, for example according to DE 102 43 620 A1, camera images or video images are also used in image-evaluating, or else what are referred to as vision-based, driver assistance systems for sensing surroundings, wherein in the known systems objects, obstacles, boundaries of carriageways and lanes and distances therefrom are determined from the camera images. For the actual capturing of images, image sensors which are referred to as imagers are used in what are referred to as vision-based surroundings-sensing systems, which image sensors then supply a camera image, also referred to as a sensor image, of the captured surroundings, the pixels or image areas of which can be evaluated in terms of intensity, contrast, colour or other parameters using corresponding data-processing means.

Such video-based driver assistance systems are used in vehicles in order to carry out a multiplicity of functions such as issuing a warning of a road exit or turning. These functions frequently require parts of the sensor image, for example a road sign, a bridge, markings on the road etc. to be able to be clearly identified as such.

Detection of irregular carriageway surface areas, such as for example tar strips resulting from partial carriageway repairs, in contrast to the normal road markings, is also often important for the driving safety of the vehicle and the optimum functioning of the driver assistance system and should be detected as such in the sensor image and differentiated, particularly also in the scope of a lane departure warning. A precondition here is that the camera captures images of the carriageway at least at the front in the direction of travel of the vehicle.

DISCLOSURE OF THE INVENTION

The invention is based on a method for evaluating sensor images of an image-evaluating surroundings-detection system on a carrier, preferably a vehicle, which moves on a carriageway and in which according to the invention irregularities of the surface of the carriageway are advantageously evaluated on the basis of their geometric extent, their brightness, their contrast and/or their reflectivity to the effect that they are differentiated from the markings relating to the predefined course of the carriageway.

Such irregularities are, in particular, tar strips on the carriageway after repair works which have specific properties which can be utilized for image evaluation. For example, the brightness values of pixels or of a row or of an area of pixels of the sensor image can advantageously be evaluated as such irregularities of the surface of the carriageway in order to determine whether they exceed a predefined range of fluctuation in terms of their width and/or length in the direction of movement of the carrier.

Tar strips, for example, exhibit a relatively large change in width since they are applied as irregular repair surfaces and are not as precisely dimensioned as road markings. According to the invention, this is utilized to the effect that the width of a possible tar strip in each image row is calculated and the change in width is detected using a mean value and the absolute deviation. For example, a mean absolute change in width in the range from 3 to 5 cm or more is so great that a tar strip can be detected here.

A practical method for measuring the change in width of such a tar strip on the carriageway can also be carried out at the edges with what is referred to as a subpixel measurement which increases the accuracy of the measurement. The subpixel measurement can take place here on just part of the sensor image which relates to a remote section where individual pixels cover a relatively large area of the carriageway in order to save processing time. Furthermore, the subpixel measurement can also be carried out using a lookup table, which then yields an only approximate but nevertheless sufficient value. Since the subpixel measurement checks in particular the edge and its proximity, the positive gradient of the brightness values is simultaneously detected and this permits improved capturing of the edge position and classification of the edge in' terms of the detection of a marking or of a tar strip.

Such pixels or a row or an area of pixels of the sensor image which exceed a predefined brightness value and/or contrast can therefore be detected as irregularities of the surface of the carriageway.

The tar strips described above are, under certain circumstances, brighter than the background to which they are applied because they reflect more strongly. A criterion for the evaluation may be here that the average contrast between the tar strip and the background exceeds a predefined threshold both on the left-hand and right-hand sides of the tar strip. The carriageway markings which are to be differentiated therefrom do not shine as brightly in this context even though they are also illuminated. There are therefore three categories of brightness in the case of the pixels in a histogram during the evaluation of the sensor image, specifically with respect to the road with a dark background, the relatively bright carriageway markings and the very bright tar strip. These categories can be used for the characterization according to the invention.

It is also possible, for example, to make use of the fact that the sensitivity which is set or selected and/or the amplification during the evaluation of images of the pixels drops below a predefined value. Such tar strips frequently have a high average contrast at the seams between two lanes on the carriageway compared to the background on both lanes. The previously described tar strips which were dark per se look relatively bright under frequent light conditions on the carriageway when the sun is at an unfavourable direction, such as coming from the front or the side with respect to the surroundings-detection system, and then it can cause relatively oily tar strips to shine or appear very bright. These bright tar strips can cause a video-based surroundings-detection system which is looking for carriageway markings which are also bright to a specific degree to make misinterpretations. The method according to the invention therefore registers a state of illumination in the surroundings-detection system with which the sensitivity is checked. If the illumination time during the sensitivity control is very short and the image amplification is low, it is possible to assume that it is a case of shining tar strips as irregularities here.

Irregularities, in particular tar strips on the carriageway, can also easily be registered if the tar strips are then significantly darker than their surroundings at an acute angle of incidence of the light beams into the image-evaluating surroundings-detection system. Such tar strips appear relatively dark or black if the optical axis deviates greatly from the capturing direction, that is to say if the optical axis points relatively steeply downward, the brightness of the tar strip changes from the shining brightness to black. However, it is necessary to take into account here the fact that such a downward-directed optical axis can only be implemented with great difficulty, the engine bonnet of the vehicle frequently being in the way.

A bright scene can be characterized in practice by looking for what is referred to as a black sun, this being an artificial sensor image phenomenon in which the brightest part of the sun is converted into an image in such a way that it appears as a black circle above the horizon. The area around the black circle of the sun must then be completely bright so that the sun can be detected as such.

The method according to the invention can also determine irregularities of the surface of the carriageway when a linear transition, or some other kind of fluid transition, in particular a specific grey scale profile, from a bright to a dark area, is registered in the direction of movement of the carrier or on the sides. A transition between the tar strip and the background can be analyzed to determine whether, in contrast to a marking, the tar strip possibly has a continuous increase in brightness in the area of transition with the carriageway since, in contrast, changes in brightness in the case of markings usually have a very steep profile.

Tar strips as irregularities occur frequently in relatively long sections such as, for example, at the seam between two different carriageway materials. The profile of these sections is not necessarily embodied in a continuously perfect fashion and therefore at first the greatest length of such a section and the intermediate spaces which possibly arise between the sections should be registered. Evaluating these data makes it possible to easily differentiate the tar strips from carriageway markings with regular dashes. In this context, relatively short tar strip sections are generally not so significant since they do not usually have to lead to a change in the lane keeping of a vehicle with the surroundings-detection system.

In an arrangement according to the invention for carrying out the previously described method, the image-evaluating surroundings-detection system contains the electronic camera which has already been mentioned and is provided on a vehicle as a carrier and continuously registers the area in front of the vehicle in the direction of travel on a carriageway in such a way that in each case a sensor image which is built up from pixels whose brightness and, if appropriate, colour values depict the surroundings is present. In addition, an evaluation unit, usually with a program-controlled computer, is present in which irregularities of the surface of the carriageway are evaluated and signalled on the basis of their geometric extent, their brightness, their contrast and/or their reflectivity, to the effect that they can be differentiated from the markings relating to the predefined course of the carriageway.

BRIEF DESCRIPTION OF THE DRAWING

An exemplary embodiment of the invention is illustrated in the figures of the drawing and will be explained below. In said drawing.

DESCRIPTION OF THE EXEMPLARY EMBODIMENT

Figure 1:
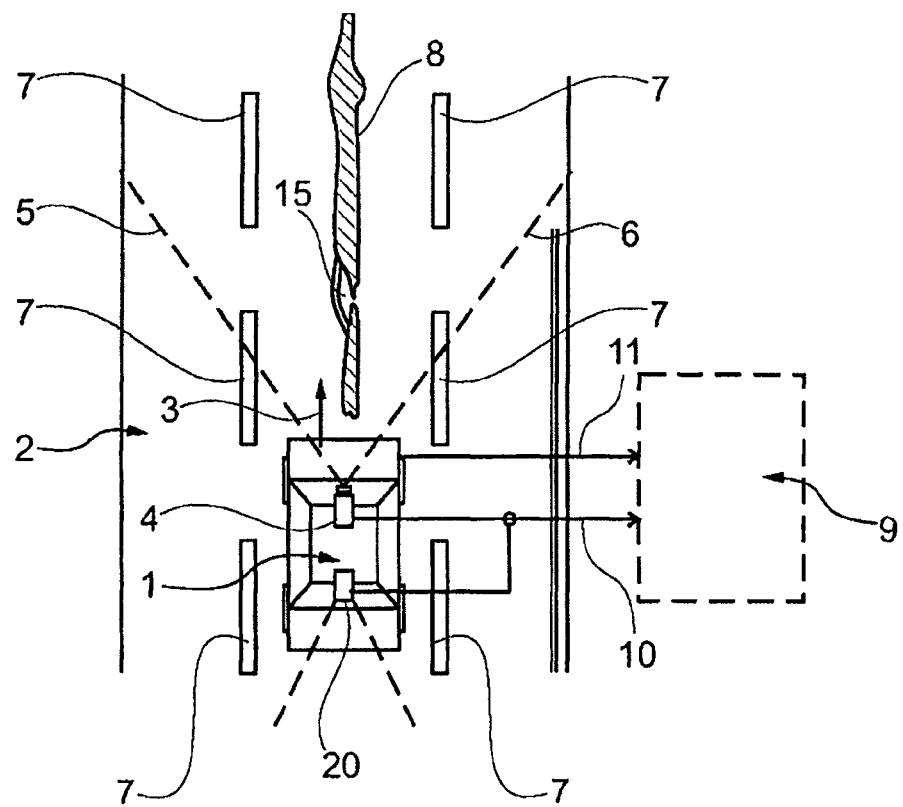
FIG. 1 is a schematic illustration of a vehicle with cameras as components of a surroundings-detection system, here for evaluating tar strips on the carriageway.

FIG. 1 is a schematic view of a situation of a vehicle 1 as a mobile carrier of a surroundings-detection system which moves on a carriageway 2 in the direction of the arrow 3. The surroundings-detection system of the vehicle 1 has a camera 4, in particular a digital video camera, which registers an area between dashed lines 5 and 6. Markings 7, which have a regular linear course, are provided on the carriageway 2. In contrast to this, irregularities of the surface of the carriageway 2 can clearly be seen in FIG. 1, which irregularities are evaluated according to the invention to the effect that they can be differentiated from markings 7 relating to the predefined course of the carriageway.

The irregularity according to FIG. 1 is formed here by a tar strip 8 as a seam between two carriageway strips which are manufactured separately on the carriageway 2 and which have specific optical properties which can be utilized for image evaluation. Therefore, in an evaluation device 9, the digital data of the sensor image, or of an area of the sensor image, of the camera 4 which is composed of pixels are evaluated at an input 10 and in addition, for example the current velocity data of the vehicle 1 are also evaluated at an input 11.

A second, optional rearward camera 20, which also makes available its output signal to the evaluation device 9 and in the process sees the tar strip 8 detected with the front camera 4 as an area of darkness, is also arranged in the exemplary embodiment shown. It is therefore possible to check whether the subject matter which is identified as a marking 7 still appears bright because the tar strip 8 is dark when it is looked at from the side facing away from the sun. This system can be used in two modes. Firstly, the rearward looking camera 20 can characterize the subject matter of interest and its positions, which subject matter is then verified with the forward looking camera 4, or secondly the camera 4 which looks ahead can identify the location of the objects, and said objects are possibly confirmed with the rearward looking camera 20.

In this context, it is also possible to operate with a (divided image split image), with the result that, for example, markings or tar strips are detected in the divided image if the forward looking camera 4 receives a forward image and a rearward image with corresponding optics. It is also possible for two such cameras (not shown here) to be provided on the vehicle 1, one on the left-hand side and one on the right-hand side. The analysis as to whether an object is a marking 7 or a tar strip 8 has then taken place as described above.

Figure 2:
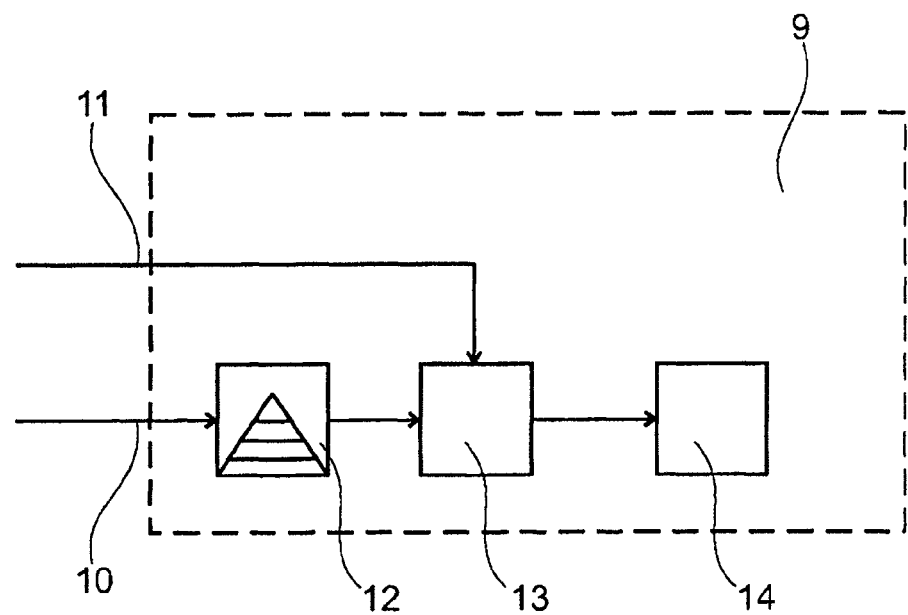
FIG. 2 is a block circuit diagram of an evaluation unit of the surroundings-detection system.

FIG. 2 shows in more detail the evaluation device 9 according to FIG. 1, wherein, in a first module 12, the data of the sensor image of the camera 4 and, if appropriate, of the camera 20 are evaluated in terms of the occurrence of brightness values which can be evaluated in predefined captured regions ROI (ROI=region of interest), and the detection of the tar strip 8 according to FIG. 1 is then carried out as explained below on the basis of these results, possibly also using the velocity data of the input 11 in a module 13, and is displayed in a display device 14 or signalled with corresponding means.

In the section which follows, the properties of the tar strips 8 which are to be evaluated and used in the image evaluation will be briefly explained, these properties do not have to necessarily be evaluated or occur all or partially together and often also to a specific extent cannot be applied in specific situations:

Property 1

The tar strips 8 usually appear relatively dark on the tar of the carriageway 2 under most lighting conditions. However, if the sun is shining from an unfavourable direction onto the carriageway, for example from the front or from the side with respect to the camera 4, it can often cause relatively oily tar strips 8 to shine and therefore to appear very bright. These relatively bright tar strips 8 can, however, possibly confuse the video-based surroundings-detection system since said system searches for normally bright markings which appear similar on the carriageway 2. In the evaluation unit 8, the search is therefore conducted for the corresponding state of illumination by analyzing the illumination controller. If the illumination period is very short and/or the amplification is low, shining tar strips 8 can be detected.

Property 2

For example, the brightness values of pixels or of a row or of an area of pixels of the sensor image can also advantageously be evaluated as such irregularities of the surface of the carriageway to determine whether they exceed a predefined range of fluctuation in terms of their width and/or length in the direction of movement of the vehicle 1. The tar strip 8 according to FIG. 1 clearly exhibits a relative large change in width since it is applied as an irregular repair surface and at the same time is not dimensioned as precisely as the markings 7. As a result, this is evaluated to the effect that the width of the tar strip 8 in each image row is calculated and the change in width is detected using a mean value and the absolute deviation. For example, an average absolute change in width in the range from 3 to 5 cm or more is of such a magnitude that here the tar strip 8 can be detected as such.

Property 3

The tar strip 8 according to FIG. 1 is applied in a relatively long section to the seam between two different carriageway strips or else two types of coating or metalling of the carriageway 2. The passage at individual sections is not completely homogeneous or fluid here. It is therefore possible to determine the greatest length in which the impression is seen, and to detect the upward transgression of a specific degree when distances occur between the sections. As a result, the dashed markings 7 are differentiated from the possible distances which are determined in the tar strip 8. However, if short sections of the tar strip 8 are registered, they are generally not so important for the surroundings-detection system since it is improbable that as a result the surroundings-detection system will take any account at all of a marking which would entail a change in the lane keeping of the vehicle 1.

Property 4

Furthermore, the tar strip 8 in the sensor image of the camera 4 can also be detected by virtue of the fact that a predefined brightness value and, in particular, contrast are exceeded. As already mentioned in property 1, the tar strip 8 then shines more brightly than the carriageway 2 when it reflects the sunlight. It is possible to derive therefrom a detection criterion such that the average contrast between the tar strip 8 and the background of the carriageway 2 exceeds a predefined threshold, specifically on both sides of the tar strip 8. The markings 7 according to the figure do not shine as brightly, even though they are equally well illuminated, and as a result three categories of pixels can be registered in a histogram or the carriageway 2: a) carriageway 2 as a dark background, b) relatively bright markings 7, c) the very bright tar strip 8. These categories can be used for characterization. The transition between the tar strip 8 and the background of the carriageway 2 can also be analyzed here. As a result of the fact that the tar strip 8 appears different from the markings 7, since its substance is shiny, a further decision as to whether or not it is a tar strip 8, can also be determined on the basis of the changes in brightness on its sides since these tend to have a steeper course than in the case of a normal marking 7.

Property 5

The tar strip 8 according to FIG. 1 can also be registered as a result of the fact that the tar strip 8 appears darker than the surroundings in the case of a steep angle of incidence of the light beams into the image-evaluating surroundings-detection system. Such a tar strip 8 appears relatively dark or black if the optical axis then deviates greatly from the capturing direction, that is to say the brightness of the tar strip changes from brightly shining to black if the optical axis points relatively steeply downwards.

Property 6

Furthermore, a detection can also take place by means of an analysis of such differences between the tar strip 8 and the markings 7, for example a marking 7 can be detected as such through consideration of the relatively sudden start of a marking 7 and through consideration of the grey scale profile between the sides of the marking 7.

Property 7

For dashed markings 7, the start of the marking 7 in the direction of travel is generally a clear line which runs approximately perpendicularly with respect to the direction of travel according to the arrow 3. In the tar strip 8, which is applied irregularly to the carriageway 2, this start is less linear. As a result, the measurement of these linearities and of the angle can provide, for the example of a marking 7 which is starting, clear information as to whether it is a normal marking 7 or the tar strip 8.

Property 8

The tar strips 8 are usually repairs on the carriageway 2 and possibly joint fillers. In the case of the tar strip shown in FIG. 1, it is possible to see, in an area 15, that here there are two partially separated strips with a narrow dark area in the centre. Normal markings 7 deviate from this appearance considerably, with the result that in the evaluation unit 9 a search is conducted for a sufficiently narrow dark area. Thresholds may be predefined here in terms of the width of this area, the darkness (possibly corresponding to the carriageway 2) and the length of the section 15 (compared to the interruption in the markings 7) which give an indication that the object is a tar strip 8. Furthermore, a change in width of the dark gap in the section 15 can give an indication that it is a tar strip.

A combination or secondary combination of these above-mentioned properties permits, with correspondingly adapted thresholds, a first classification of an object which is registered on the surroundings-detection system on the carriageway 2 in terms of whether or not the object is a tar strip 8. It is possible here to use a time filter to evaluate the properties themselves and/or the sequence of occurrence of the properties and already make a first rough decision very early. All that is necessary here is that a sufficient number of measurement results are available in a sufficient time period in order to make a reliable decision. In such situations in which multiple markings 7 are present in such a way that they could lead to uncontrolled jumping from one marking 7 to a tar strip 8, the detection of tar strips 8 will be suspended. In addition, it is to be noted that the vehicle 1 which is fitted with the surroundings-detection system is preferably equipped with driver assistance systems, and here in particular with a lane-keeping support system which utilizes the information acquired with the surroundings-detection system for its function.

The invention claimed is:

1. A method for evaluating sensor images of an image-evaluating surroundings-detection system on a carrier comprising a driver assistance system and which moves on a carriageway, the method comprising:
    evaluating irregularities of a surface of the carriageway using a predefined range of fluctuation in width or length in a direction of movement of the carrier on the basis of at least one selected from the a group consisting of a shape, a geometric extent, a brightness, a contrast and a reflectivity of the irregularities; and signalling an effect to which the irregularities are differentiated from markings relating to a predefined course of the carriageway; and
    wherein the brightness irregularities consist of brightness values of pixels of the sensor image, and the brightness values are evaluated as irregularities of the surface of the carriageway to determine whether the brightness values of the pixels exceed a predefined range of variation in terms of a width and a length in a direction of movement of the carrier.

2. The method according to claim 1, wherein a deviation of more than 3 to 5 cm is registered as an upward transgression of the range of variation.

3. The method according to claim 1, wherein the brightness irregularities consist of brightness values of pixels of the sensor image, and the brightness values are evaluated as irregularities of the surface of the carriageway to determine whether the brightness values of the pixels exceed a predefined brightness value and/or contrast.

4. The method according to claim 3, wherein an upward transgression of the brightness value and/or contrast is registered when the sensitivity and the amplification drops below a predefined value during the evaluation of images of the pixels.

5. The method according to claim 1, wherein the brightness values of pixels of the sensor image are registered as irregularities of the surface of the carriageway if the pixels are darker than the surroundings at an acute angle of incidence of the light beaming into the image-evaluating surroundings-detection system.

6. The method according to claim 1, wherein the brightness values of pixels of the sensor image are registered as irregularities of the surface of the carriageway if a fluid transition, from a bright area to a dark area, is registered in a direction of movement of the carrier.

7. The method according to claim 1, wherein tar strips and tar joints which have been provided on the carriageway are registered as irregularities.

8. An arrangement for evaluating sensor images of an image-evaluating surroundings-detection system on a carrier which has a driver assistance system, comprising:
    at least one electronic camera contained in the image-evaluating surroundings-detection system, wherein the at least one camera is provided on a vehicle which acts as the carrier comprising a lane-keeping support system, wherein the at least one camera is configured to continuously register an area in front of the vehicle in a direction of travel of the vehicle on a carriageway;
    a sensor image formed from the area registered by the at least one electronic camera, wherein the sensor image comprises pixels with brightness values and color values configured to depict the surroundings;
    an evaluation device configured to evaluate irregularities of a surface of the carriageway using a predefined range of fluctuation in width or length in a direction of movement of the carrier on the basis of one selected from a group consisting of a shape, a geometric extent, a brightness, a contrast and a reflectivity of the irregularities of the surface, and to signal an effect to which the irregularities are differentiated from markings relating to a predefined course of the carriageway; and
    wherein the brightness irregularities consist of brightness values of pixels of the sensor image, and the brightness values are evaluated as irregularities of the surface of the carriageway to determine whether the brightness values of the pixels exceed a predefined range of variation in terms of a width and a length in a direction of movement of the carrier.

9. The arrangement according to claim 8, further comprising one or more rearward looking cameras, wherein at least one of the rearward looking cameras detects an irregularity or a marking which is then verified with the at least one electronic camera, or the at least one electronic camera identifies the location of the irregularity or of the marking and verifies the latter with the at least one of the rearward looking cameras.

10. The arrangement according to claim 8, wherein at least one of the electronic cameras operates with a divided image, resulting in said electronic camera receiving a forward looking image and a rearward looking image with corresponding optics.

11. A computer program product stored on a non-transitory computer-usable medium, comprising computer-readable program instructions which, when the computer program product is executed on a microprocessor with an associated storage means, cause said microprocessor to carry out the method as claimed in claim 1.

* * * * *